United States Patent
Arai et al.

(10) Patent No.: US 7,270,425 B2
(45) Date of Patent: Sep. 18, 2007

(54) PROJECTION TYPE VIDEO DISPLAY

(75) Inventors: Kazuhiro Arai, Osaka (JP); Yasuo Funazou, Nara (JP)

(73) Assignee: Sanyo Electric Co., Ltd., Osaka (JP)

( * ) Notice: Subject to any disclaimer, the term of this patent is extended or adjusted under 35 U.S.C. 154(b) by 80 days.

(21) Appl. No.: 10/540,544

(22) PCT Filed: Dec. 25, 2003

(86) PCT No.: PCT/JP03/16835

§ 371 (c)(1), (2), (4) Date: Jun. 24, 2005

(87) PCT Pub. No.: WO2004/059608

PCT Pub. Date: Jul. 15, 2004

(65) Prior Publication Data

US 2006/0050245 A1    Mar. 9, 2006

(30) Foreign Application Priority Data

Dec. 26, 2002 (JP) ............................. 2002-377873

(51) Int. Cl.
G03B 21/14 (2006.01)

(52) U.S. Cl. .............................. 353/87; 353/31; 349/5; 362/231

(58) Field of Classification Search ................ 353/31, 353/34, 37, 887, 94; 362/612, 613, 561, 362/231, 800; 349/5, 7, 8, 9; 359/634, 618; 348/742, 743

See application file for complete search history.

(56) References Cited

U.S. PATENT DOCUMENTS 5,971,545 A * 10/1999 Haitz ........................... 353/31
6,547,400 B1 * 4/2003 Yokoyama ................... 353/98
6,547,421 B2 * 4/2003 Sugano ........................ 362/268
6,769,772 B2 * 8/2004 Roddy et al. ................. 353/31
6,882,379 B1 * 4/2005 Yokoyama et al. ........... 349/61
6,916,097 B2 * 7/2005 Omoda et al. ................ 353/31
6,918,682 B2 * 7/2005 Kim et al. .................... 362/231
6,932,477 B2 * 8/2005 Stanton ........................ 353/31
6,939,027 B2 * 9/2005 Harumoto .................... 362/336
6,975,294 B2 * 12/2005 Manni et al. ................. 345/83

(Continued)

FOREIGN PATENT DOCUMENTS

EP    1 003 062    5/2000

(Continued)

Primary Examiner—William C. Dowling
(74) Attorney, Agent, or Firm—McDermott Will & Emery LLP

(57) ABSTRACT

An optimal processing portion (21) inputs a video signal (RGB signals) and analyzes 1-frame video in the video signal. For example, if the intensity of red color is 0 percent in all dots in 1-frame video, the optimal processing portion (21) applies to a light source gain adjustment portion (22) a control signal for rendering a gain of the illuminating device (1R) 0 percent (minimum amount of light). The light source gain adjustment portion (22) receives the control signal and controls power supply to the illuminating device (1R). In addition, the optimal processing portion (21) applies a driving instruction for rendering the amount of light transmission 0 percent with regard to all dots of the liquid crystal display panel (3R), for example, to a LCD signal processing portion (23).

11 Claims, 4 Drawing Sheets

U.S. PATENT DOCUMENTS

| | | | |
|---|---|---|---|
| 7,070,281 B2 * | 7/2006 | Kato | 353/20 |
| 2002/0154277 A1 | 10/2002 | Mukawa et al. | |
| 2003/0025842 A1 * | 2/2003 | Saccomanno | 348/758 |
| 2004/0207822 A1 * | 10/2004 | Lee et al. | 353/98 |
| 2004/0227907 A1 * | 11/2004 | Glenn | 353/94 |
| 2005/0200812 A1 * | 9/2005 | Sakata et al. | 353/20 |
| 2005/0219464 A1 * | 10/2005 | Yamasaki et al. | 353/20 |

FOREIGN PATENT DOCUMENTS

| | | |
|---|---|---|
| JP | 10-186507 | 7/1998 |
| JP | 2000-214827 | 8/2000 |
| JP | 2000-221499 | 8/2000 |
| JP | 2001-42431 | 2/2001 |

* cited by examiner (a)  (b)

(a)  (b)

SINGLE-PANEL SYSTEM

THREE-PANEL SYSTEM

PROJECTION TYPE VIDEO DISPLAY

CONTINUATION DATA

This application is a 371 of PCT/JP03/16835 filed Dec. 25, 2003.

TECHNICAL FIELD

The present invention relates to a projection type video display such as a liquid crystal projector, and the like.

PRIOR ART

Generally, an illuminating device used for a liquid crystal projector, and etc., is formed of a lamp such as an ultra-high pressure mercury lamp, a metal halide lamp, a xenon lamp, and etc., and a parabolic reflector that renders the irradiating light a parallel light. Furthermore, in recent years, from the viewpoint of a longer operating life, and a power-saving, and the like, it is attempted to use a light-emitting diode (LED) as a light source (see Japanese Patent Laying-open No. H10-186507).

However, the power-saving in the prior art is achieved by a low-power-consumption operating characteristic of a solid light source itself, and a further power-saving illumination device has not been realized.

SUMMARY OF THE INVENTION

In view of the foregoing circumstances, it is an object of the present invention to provide a projection type video display capable of realizing a power-saving by using a solid light source such as a light-emitting-diode, and the like.

In order to solve the above-mentioned problem, a projection type video display of the present invention comprises a first solid light source that emits a light in red, a second solid light source that emits a light in green, a third solid light source that emits a light in blue, a display panel for receiving and modulating the lights in colors from the light sources, a means for projecting a full color image light formed of the modulated lights in colors, a light source adjustment means for adjusting an amount of emitted light of the solid light sources by controlling power supplied thereto on the basis of video signal information, and a means for controlling a driving signal to each display panel so as to correspond to an adjustment of the amount of the emitted lights in respective colors.

With the above-described configuration, an amount of emitted light of the solid light sources is adjusted in accordance with a video signal by controlling power supplied to the solid light sources, so that the more dark videos exist, the less power is consumed. In addition, it is not necessary to have high cooling capacity, and besides, it is possible to reduce power consumption for cooling.

Each solid light source may be formed of being provided with a plurality of solid light-emitting elements and the light source adjustment means may adjust an amount of emitted light of each solid light source by controlling the number of pieces of light emission out of the plurality of solid light-emitting elements. Or, it may be configured that each solid light source is formed of being provided with a plurality of solid light-emitting elements and the light source adjustment means adjusts the amount of emitted light of each solid light source by controlling power supplied to each solid light emitting element. Or, it may be configured that each solid light source is formed of being provided with a plurality of solid light-emitting elements and the light source adjustment means causes each solid light-emitting element to perform a pulse light-emission and adjusts the amount of emitted light of each solid light-emitting element by controlling a duty ratio of the pulse light-emission.

The amount of emitted light of the solid light sources for respective colors may be adjusted by controlling the power supplied thereto so as to obtain the highest value of respective colors in 1-frame video in a state where a value of a gradation of the display panel is the highest. This enables the power consumption to be reduced as much as possible.

The projection type video display may be configured that a light in white obtained by combining lights in respective colors from respective light sources is guided to a single-panel full color display panel as the display panel. Or, the projection type video display may be configured that the light in white obtained by combining lights in respective colors from respective light sources is separated and each of the lights in respective colors is respectively guided to the red color-use display panel, the green color-use display panel, and the blue color-use display panel as the display panel. Or, the projection type video display may be configured that each of the lights in respective colors is guided to the red color-use display panel, the green color-use display, and the blue color-use display panel as the light in respective colors.

Figure 1:
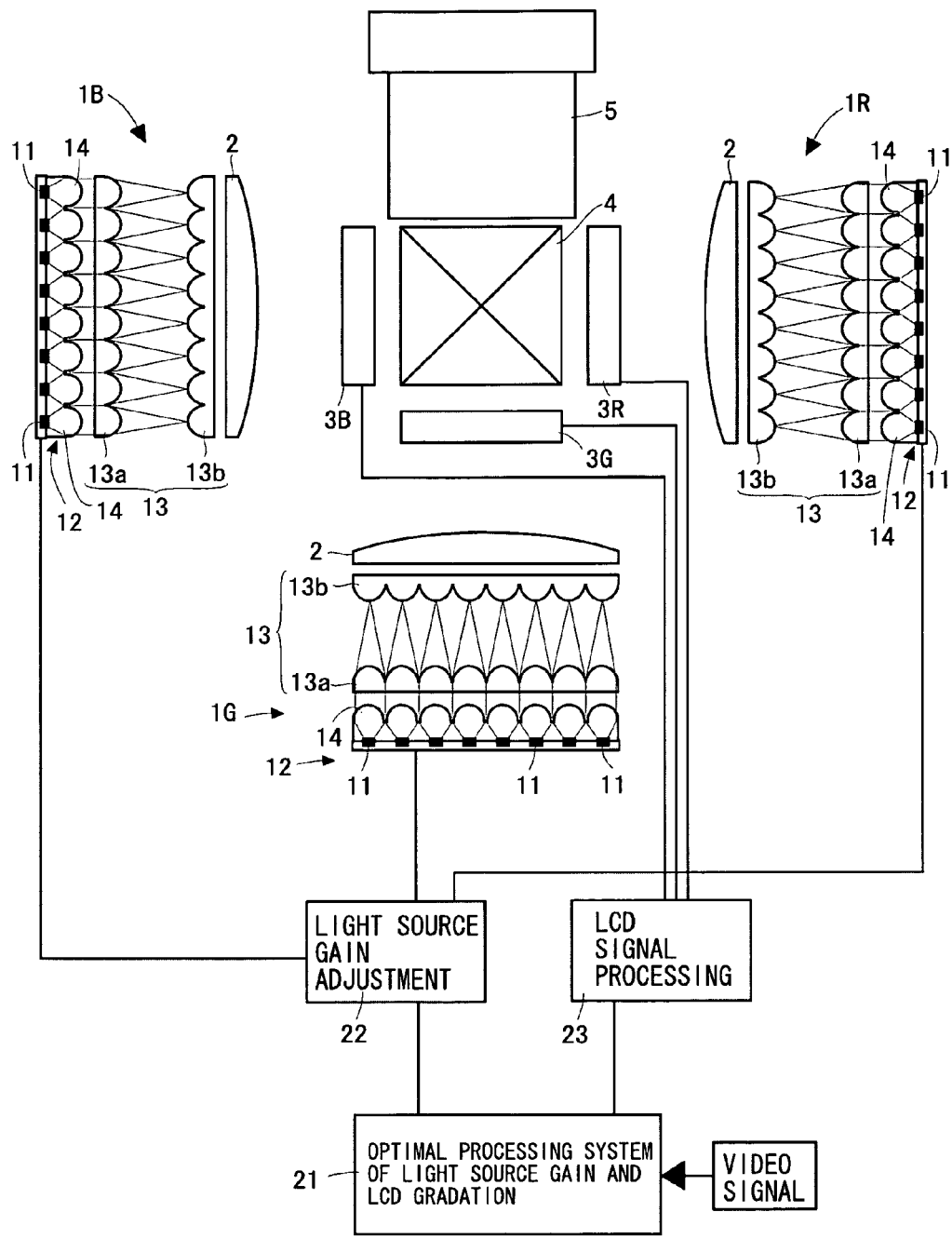
FIG. 1 is a descriptive diagram showing an optical system and a control system of a projection type video display of an embodiment of the present invention.
Figure 2:
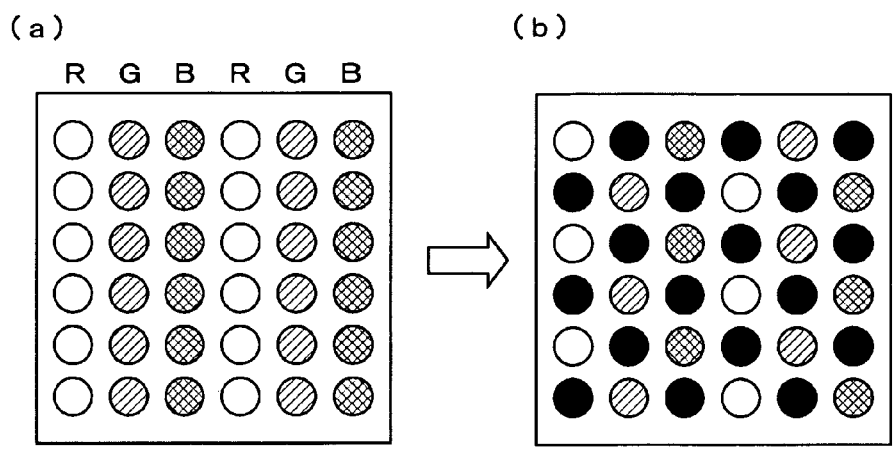
FIG. 2 shows an illuminating device in which three illuminating devices exist in one plane surface.
Figure 3:
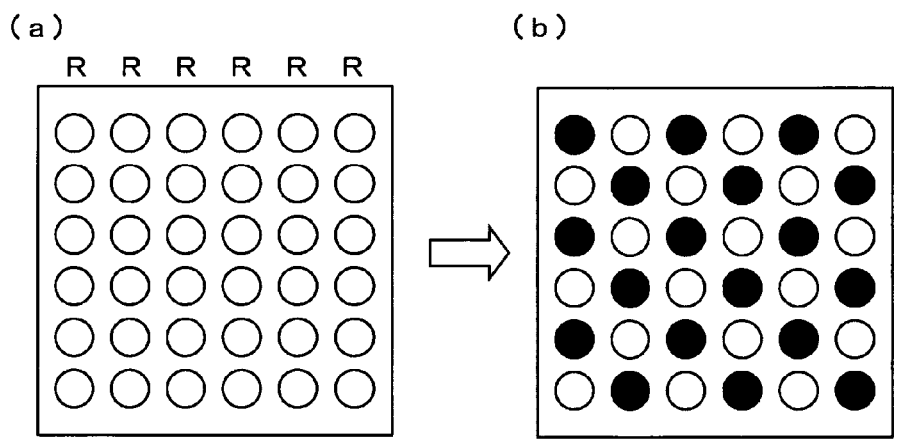
Figure 4:
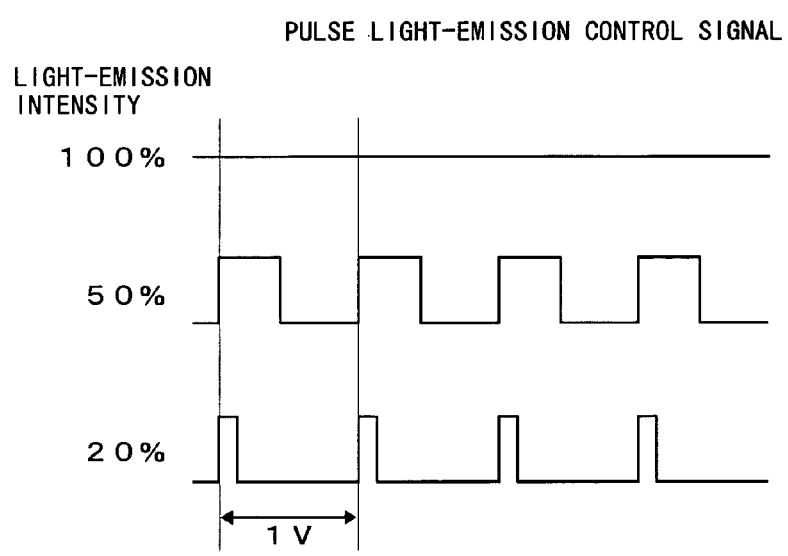
Figure 5:
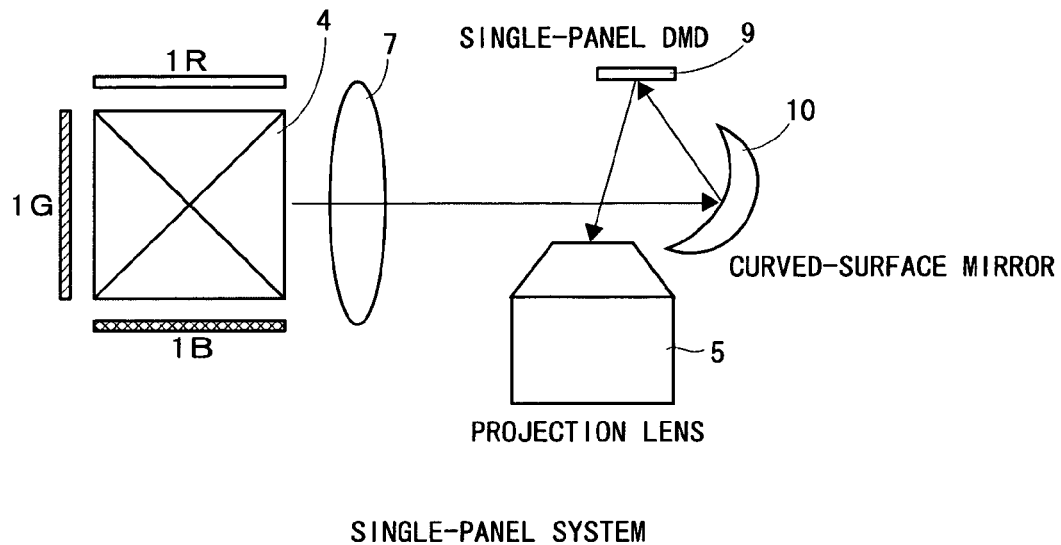

A portion (a) in FIG. 2 shows a state where all LED chips are turned on;

A portion (b) in FIG. 2 shows a state where some of the LED chips are turned off in three illuminating devices;

FIG. 3 is a front view showing a red color-use illuminating device out of the illuminating devices shown in FIG. 1;

A portion (a) in FIG. 3 shows a state all the LED chips are turned on;

A portion (b) in FIG. 3 shows a state where some of the LED chips 11 are turned off;

FIG. 4 is a descriptive diagram showing a changing state of a duty ratio of a pulse light-emission during each frame period;

FIG. 5 is a descriptive diagram of a single-panel DMD system; and

Figure 6:
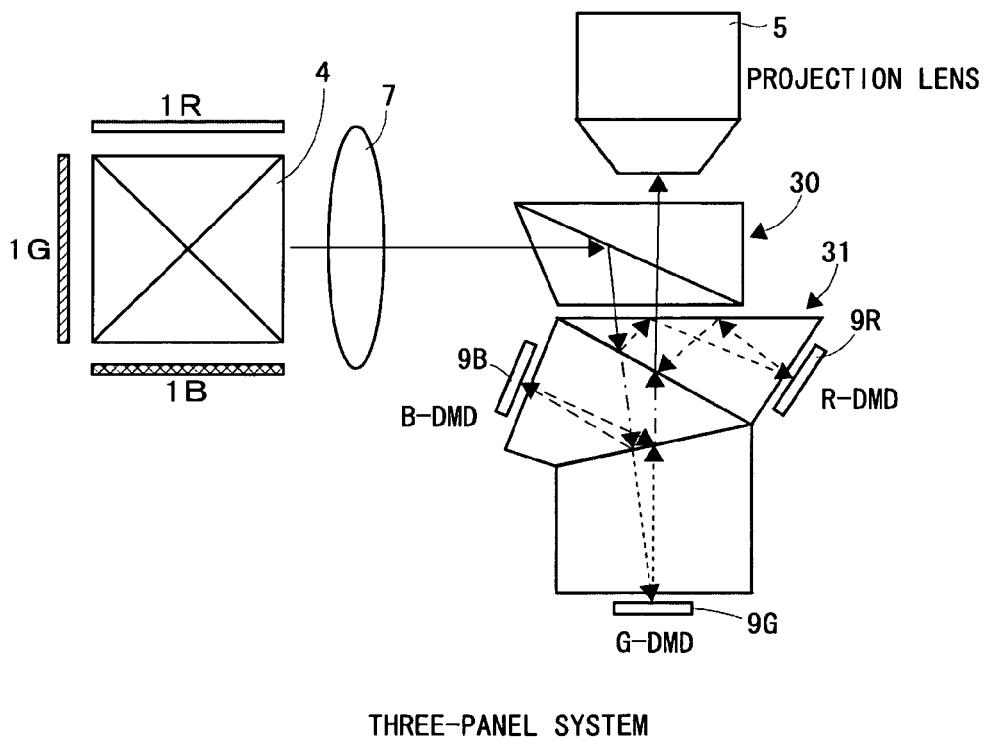

FIG. 6 is a descriptive diagram of a three-panel DMD system.

BEST MODE FOR PRACTICING THE INVENTION

Hereinafter, a projection type video display according to an embodiment of the present invention will be described referring to FIGS. 1 to 6.

FIG. 1 is a diagram showing an optical system and a control system of a three-panel projection type video display. This projection type video display is provided with three illuminating devices 1R, 1G, and 1B (Hereinafter, a numeral "1" is used when showing not specifying each illuminating device). The light source 1R emits a light in red, the light source 1G emits a light in green, and the light source 1B emits a light in blue. The light emitted from each of the illuminating devices 1 is guided by a convex lens 2 to liquid crystal display panels 3R, 3G, and 3B (Hereinafter, a numeral "3" is used when showing not specifying each liquid crystal panel). Each liquid crystal display panel 3 is formed of being provided with an incidence-side polarizing plate, a panel portion formed by sealing a liquid crystal between a pair of glass plates (in which a dot electrode and an alignment film are formed), and an emission-side polarizing plate. Modulated lights (image lights in respective colors) modulated by passing through the liquid crystal display panels 3R, 3G, and 3B are combined by a dichroic prism 4, and rendered color image light. The color image light is projected by a projection lens 5, and is displayed on a screen.

The illuminating device 1 is formed of a light source 12 in which LED chips 11 are arranged in an array shape and lens cells 14 are arranged on a light-emission side of each of the LED chips 11, and a pair of fly's eye lenses 13 that integrates and guides to the liquid crystal panel 3 the light emitted from each of the LED chips 11 and rendered parallel by the lens cells 14. The pair of fly's eye lenses 13 is structured of a pair of lens clusters 13a, 13b, and each pair of lenses guides the light emitted from each LED chip 11 to an entire surface of the liquid crystal display panel 3. The LED chips 11 are molded by transparent resin and as a result of this transparent resin being formed in a convex shape, the lens cells 14 are formed. The LED chip 11, the lens cell 14, and each lens in the lens cluster 13a are formed in a rectangular shape, and further, an aspect ratio of the rectangular is coincident or approximately coincident with an aspect ratio of the liquid crystal display panel 3. It is noted that the aspect ratios of the LED chip 11, the lens cell 14, and each lens in the lens cluster 13a may be rendered different from the aspect ratio of the liquid crystal display panel 3. In this case, it is preferable that an aspect ratio of light flux guided to the liquid crystal panel 3 is rendered coincident or approximately coincident with the aspect ratio of the liquid crystal panel 3 by using an anamorphic lens.

An optimal processing portion 21 inputs a video signal (RGB signals) and analyzes a 1-frame video in the video signal. Specifically, the optimal processing portion detects intensity of red color (red color gradation signal), intensity of green color (green color gradation signal), and intensity of blue color (blue color gradation signal) of respective dots forming 1-frame video. Here, in order to simplify the description, it is assumed that the intensity of respective colors is normally within a range of a 256-gradation, and this range is between 0 and 100 percent, an amount of light transmission of the liquid crystal display panel 3 is controlled by a 100-gradation, and as for each illuminating device 1, too, the amount of light is adjusted by each 1 percent in a range of between 1 and 100 percent.

If the intensity of red color is 0 percent in all dots in the 1-frame video, the optimal processing portion 21 applies to a light source gain adjustment portion 22 a control signal for rendering a gain of the illuminating device 1R 0 percent (minimum amount of light). The light source gain adjustment portion 22 receives the control signal and controls a power (voltage) to be supplied to the illuminating device 1R. Moreover, the optimal processing portion 21 applies to an LCD signal processing portion 23 a driving instruction for rendering the amount of light transmission 0 percent, for example, with regard to all dots of the liquid crystal display panel 3R. The LCD signal processing portion 23 drives the dots of the liquid crystal display panel 3R on the basis of the driving instruction.

When a highest value of the intensity of red color in the 1-frame video is 50 percent, as for the dots of which value of the intensity of red color is 50 percent, the amount of light transmission is 100 percent, and as for the illuminating device 1R, the amount of emitted light is 50 percent. With regard to the dots having the value of intensity of red color other than 50 percent, a correction corresponding to the amount of emitted light of the illuminating device 1R being rendered 50 percent may be applied to the original intensity of red color according to the video signal. That is, the amount of emitted light of the solid light sources for respective colors may be adjusted according to a power supply control such that the highest value of respective colors in the 1-frame video is obtained in a state where a value of a gradation of the display panel is the highest. Such the control enables a least amount of power to be consumed in the illuminating device 1. Needless to say, the present invention is not limited to such the control, and as for the dots of which value of the intensity of red color is 50 percent, such a control as to render the amount of light transmission 70 percent and to render the amount of the emitted light of the illuminating device 1R 70 percent may be performed. In this case, too, with regard to the dots having the value of intensity of red color other than 50 percent, a correction corresponding to the amount of emitted light of the illuminating device 1R being rendered 70 percent may be applied to the original intensity of red color according to the video signal.

In addition, a similar control may be performed also with regard to other colors. A conventional projection type video display receives power supply in such a manner as to emit light at a highest amount of light also in displaying black video. However, the projection type video display according to the present invention is capable of rendering 0 (zero) the power supply to the illuminating device 1, for example, in displaying the black video. As a result, it is possible to greatly reduce the power consumption.

It is noted that, in the above-described configuration, the power (voltage) supplied to each illuminating device 1 (that is, the LED chips 11) is controlled by the light source gain adjustment portion 22, and however, the amount of emitted light of each illuminating device 1 may be adjusted by controlling the number of the LED chips 11 made to emit light. FIG. 2 shows the illuminating device in which three illuminating devices 1R, 1G, and 1B exist. A portion (a) in FIG. 2 shows a state where all the LED chips 11 are turned on, and a portion (b) in FIG. 2 shows a state where some of the LED chips 11 are turned off in the illuminating devices 1R, 1G, and 1B. The LED chips 11 that are turned off are shown by a black color in the Figure. It is noted that the lights in respective colors are superposed and emitted from such the illuminating device, so that the light may be guided to a single-panel full color display panel. Or, the light may be divided into the lights in respective colors by a dichroic mirror and guided to the display panels for respective colors. In addition, FIG. 3 is a front view showing the illuminating device 1R shown in FIG. 1. That is, the illuminating device 1R is formed in such a manner that the LED chips 11 that emit a light in red are arranged in an array shape in one plane surface. A portion (a) in FIG. 3 shows the state where all the LED chips 11 are turned on, and a portion (b) in FIG. 3 shows the state where some of the LED chips 11 are turned off. When turning off the LED chips 11, as shown in the portion (b) in FIG. 2 and the portion (b) in FIG. 3, the LED chips may be turned off in a dispersing fashion, but this is not always the case, and the LED chips may be turned off orderly from the LED chips located on an edge side.

Furthermore, the LED chips 11 are caused to perform a pulse light-emission, and as shown in FIG. 4, the amount of light may be controlled by changing a duty ratio of the pulse light-emission during each frame period (1V: vertical period).

Moreover, the configuration using the liquid crystal display panel is shown, however, the present invention is not limited to using the liquid crystal display panel. Instead, a display panel, a type in which each one of micro mirrors is driven singly (for example, a digital micro mirror device: DMD), may be used. In the case of the single-panel projection type video display, for example, as shown in FIG. 5, the illuminating devices 1R, 1G, and 1B are arranged in such a manner as to face respectively three of four side surfaces of the dichroic prism 4, and a light in white is emitted from the other side surface of the dichroic prism 4. Then, the light in white is irradiated onto a single panel DMD 9 via a lens 7 and a curved surface mirror 10. The light reflected by the single panel DMD 9 (full color image light) is projected by a projection lens 5. In addition, in the case of the three-panel projection type video display, for example, as shown in FIG. 6, the illuminating devices 1R, 1G and 1B are arranged in such a manner as to face respectively three of four side surfaces of the dichroic prism 4, and the light in white is emitted from the other side surface of the dichroic prism 4. Then the light in white is guided to a total internal reflection (TIR) prism 30 via the lens 7. The light in white reflected by the total internal reflection prism 30 is guided to a color separation prism 31 formed of three prisms. Then, the lights in respective colors are guided to the DMDs for respective colors 9R, 9G, and 9B. Reflected lights (image lights in respective colors) therefrom are incident on the color separation prism 31 again, and emitted from the color separation prism 31 after becoming a full color image light. The full color image light emitted from the color separation prism 31 transmits the total internal reflection prism 30 and is projected by a projection lens 5.

The configuration of the illuminating device 1 is not limited to the above-described configuration. For example, instead of a pair of fly's eye lenses 13, it is possible to use a rod integrator. Also the solid light source is not limited to the light emitting diode (LED) and it is possible to use a laser diode, and the like. In addition, the optimal processing portion 21 may perform a three-level determination (dark, middle, bright) toward the input video signal and may control the amount of light and the driving of the panel under the three levels.

As described above, with the present invention, the amount of emitted light of the solid light source is adjusted in accordance with the video signal, so that the more dark videos exit, the less the power is consumed. Moreover, there are such advantages that it is not necessary to have high cooling capacity and it is possible to reduce power consumption for cooling.

What is claimed is:

1. A projection type video display, comprising:
a first solid light source that emits a light in red;
a second solid light source that emits a light in green;
a third solid light source that emits a light in blue;
a display panel for receiving and modulating said lights in colors from said light sources;
a means for projecting a full color image light formed of said modulated lights in colors;
an optimal processing system for determining the highest value of an intensity of each color in 1-frame video;
a light source adjustment means for adjusting an amount of emitted light of said solid light sources by controlling power supplied thereto based on the highest value for each color in 1-frame video; and
a means for controlling a driving signal to the display panel so as to correspond to an adjustment of the amount of the emitted lights in respective colors.

2. A projection type video display according to claim 1, wherein each solid light source is formed of being provided with a plurality of solid light-emitting elements, and said light source adjustment means controls an amount of emitted light of each solid light source by controlling the number of pieces of light emission out of the plurality of solid light-emitting elements.

3. A projection type video display according to claim 1, wherein each solid light source is formed of being provided with a plurality of solid light-emitting elements, and said light source adjustment means adjusts an amount of emitted light of each solid light source by controlling power supplied to each solid light-emitting element.

4. A projection type video display according to claim 1, wherein each solid light source is formed of being provided with a plurality of solid light-emitting elements, said light source adjustment means causes each solid light-emitting element to perform a pulse light-emission and adjusts an amount of emitted light of each solid light-emitting element by controlling a duty ratio of the pulse light-emission.

5. A projection type video display according to any one of claims 1 to 4, wherein the amount of emitted light of said solid light sources for respective colors is adjusted by controlling the power supplied thereto so as to obtain the highest value of respective colors in 1-frame video in a state where a value of a gradation of the display panel is the highest.

6. A projection type video display according to any one of claims 1 to 4, wherein a light in white obtained by combining lights in respective colors from respective light sources is guided to a single-panel full color display panel as said display panel.

7. A projection type video display according to any one of claims 1 to 4, wherein a light in white obtained by combining lights in respective colors from respective light sources is separated, and each of the lights in respective colors is guided to a red color-use display panel, a green color-use display panel, and a blue color-use display panel as said display panel, respectively.

8. A projection type video display according to any one of claims 1 to 4, wherein each of the lights in respective colors is guided to the red color-use display panel, the green color-use display panel, and the blue-color use display panel as the light in respective colors.

9. A projection type video display according to claim 5, wherein a light in white obtained by combining lights in respective colors from respective light sources is guided to a single-panel full color display panel as said display panel.

10. A projection type video display according to claim 5, wherein a light in white obtained by combining lights in respective colors from respective light sources is separated, and each of the lights in respective colors is guided to a red color-use display panel, a green color-use display panel, and a blue color-use display panel as said display panel, respectively.

11. A projection type video display according to claim 5, wherein each of the lights in respective colors is guided to the red color-use display panel, the green color-use display panel, and the blue-color use display panel as the light in respective colors.

* * * * *